United States Patent [19]
Hasegawa

[11] Patent Number: 5,576,907
[45] Date of Patent: Nov. 19, 1996

[54] VARIABLE SPEED RECORDING AND/OR REPRODUCING APPARATUS INCLUDING A PLURALITY OF ROTARY HEADS ARRANGED WITH HEAD GAPS HAVING PARTICULAR AZIMUTH ANGLES

[75] Inventor: Masahide Hasegawa, Yokohama, Japan

[73] Assignee: Canon Kabushiki Kaisha, Tokyo, Japan

[21] Appl. No.: 476,044

[22] Filed: Jun. 7, 1995

Related U.S. Application Data

[63] Continuation of Ser. No. 94,316, Jul. 21, 1993, abandoned.

[30] Foreign Application Priority Data

Jul. 31, 1992 [JP] Japan .................. 4-224699
Jul. 31, 1992 [JP] Japan .................. 4-224700

[51] Int. Cl.⁶ .............. G11B 15/14; G11B 5/52; G11B 21/04; G11B 21/18
[52] U.S. Cl. ................ 360/64; 360/107; 386/74
[58] Field of Search ............... 360/64, 107, 84, 360/10.3, 14.1, 19.1, 37.1; 358/310, 312

[56] References Cited

U.S. PATENT DOCUMENTS

| | | | |
|---|---|---|---|
| 4,603,360 | 7/1986 | Fujiki et al. | 360/10.3 X |
| 4,743,978 | 5/1988 | Tanaka | 358/310 |
| 4,897,739 | 1/1990 | Hasegawa et al. | 360/37.1 |
| 4,974,111 | 12/1990 | Platte et al. | 360/14.1 |
| 5,051,846 | 9/1991 | Tsushima et al. | 360/19.1 |
| 5,053,890 | 10/1991 | Namiki | 360/64 X |
| 5,057,944 | 10/1991 | Ozaki et al. | 360/64 X |
| 5,301,070 | 4/1994 | Tanaka | 360/10.3 X |
| 5,341,248 | 8/1994 | Amada et al. | 360/64 X |

FOREIGN PATENT DOCUMENTS

| | | |
|---|---|---|
| 0117455 | 9/1984 | European Pat. Off. . |
| 0554867 | 8/1993 | European Pat. Off. . |
| 59-213002 | 12/1984 | Japan . |
| 01-277301 | 11/1989 | Japan . |
| 1-277304 | 11/1989 | Japan . |
| 1-302518 | 12/1989 | Japan . |
| 2035658 | 6/1980 | United Kingdom . |
| 2183892 | 6/1987 | United Kingdom . |

OTHER PUBLICATIONS

Patent Abstracts of Japan, Kokai No. 2–061813, vol. 14, No. 240, May 1990.

*Primary Examiner*—Aristotelis Psitos
*Assistant Examiner*—Patrick Wamsley
*Attorney, Agent, or Firm*—Fitzpatrick, Cella, Harper & Scinto

[57] ABSTRACT

In a recording/reproducing apparatus having rotary heads, heads A, C, E and G having a first azimuth, and heads B, D, F and H having a second azimuth are alternately arranged, and heads A' and E' having a second azimuth are disposed adjacent to the heads A and E', respectively. The use of the heads A', C, E' and G permits recording and reproducing at ½ speed with the same track pitch. The positions of the heads A and E are deviated by predetermined amounts from the equal interval positions on the periphery of a rotating drum so that recording and reproducing can be performed with the same track pitch at least at ¼ speed.

14 Claims, 11 Drawing Sheets

VARIABLE SPEED RECORDING AND/OR REPRODUCING APPARATUS INCLUDING A PLURALITY OF ROTARY HEADS ARRANGED WITH HEAD GAPS HAVING PARTICULAR AZIMUTH ANGLES

This application is a continuation of application Ser. No. 08/094,316 filed Jul. 21, 1993 now abandoned.

BACKGROUND OF THE INVENTION

1. Field of the Invention

The present invention relates to a rotary head-type recording and/or reproducing apparatus, and particularly to a rotary head-type recording and/or reproducing apparatus suitable for, for example, recording and/or reproducing digital signals.

2. Description of the Related Art

As is generally known, an apparatus for recording and/or reproducing large amounts of digital signals such as video signals at a high speed must be equipped with many heads which simultaneously contact a tape for decreasing a bit rate per signal system by distributing signals to the many heads. FIG. 1 shows an example of the arrangement of rotary heads in a digital recording and/or reproducing apparatus equipped with eight heads on which a tape is wound for 180°+α for distributing signals to four systems.

In FIG. 1, heads 2A to 2H provided on the periphery of a rotating drum 1 at equal intervals and the same height successively contact and separate from a magnetic tape 3 with the rotation of the rotating drum 1. Since at least four heads simultaneously contact the tape 3, four signals can be recorded or reproduced. The track pattern shown in FIG. 2 is thus formed on the magnetic tape 3 at a track pitch T substantially proportional to the feed speed of the tape 3. In this example, the azimuth angles of adjacent heads are respectively set to +A° and −A° so that a high recording density can be obtained by a so-called azimuth overwrite technique, without using a guard band.

In the arrangement of the rotary heads described above with reference to FIGS. 1 and 2, there is a demand for changing a bit rate of digital signals which can be recorded and/or reproduced. Namely, there is a demand for recording and/or reproducing signals for a longer time by decreasing the information amount using the technique of band compression or the like, though this tends to deteriorate the image quality to some extent.

In the above example, the demand can be satisfied by the following three possible methods:

(1) A method of changing the tape speed alone.

(2) A method of proportionally changing the tape speed and the rotational speed of the rotating drum.

(3) A method of proportionally changing the tape speed and the number of the heads used.

However, all of these methods have critical problems. The problems with these methods are described below with reference to a case where the bit rate is halved, and the recording time is doubled.

In the first method, the track pitch is halved, as shown in FIG. 3, thereby decreasing the S/N (signal-to-noise) ratio by about 3 dB. Although an analog recording type apparatus generally employs this method, this method increases the error rate of data in recording of digital signals and thus has significant adverse effects on recording.

In the second method, although the track pitch is constant, the rotational speed of the rotating drum 1 is halved, thereby causing mechanical troubles such as an increase in rotational unevenness, poor contact between a head and a tape, and the like. There is also an electrical problem that since the frequency of the signal handled by the heads is halved, a transmission system comprising a reproduction amplifier, an equalizer or the like cannot be optimized.

In the third method, although two-system parallel recording is performed by using the heads 2A, 2C, 2E and 2G (refer to FIG. 4), crosstalk occurs due to the use of the four heads having the same azimuth angle. The use of the other heads causes trouble in that the track pitch varies.

In consideration of the above points, the inventors have previously proposed a rotary head-type recording and/or reproducing apparatus which is arranged so that recording and/or reproducing can be realized with a constant track pitch in spite of a change in the tape speed.

This apparatus is described below.

FIG. 5 is a drawing illustrating the arrangement of rotary heads in a digital video tape recorder (DVTR) as an example of the above apparatus. In FIG. 5, reference numerals 2A, 2C, 2E and 2G each denote a head with a first azimuth angle, and reference numerals 2B, 2D, 2F and 2H each denote a head with a second azimuth angle. The heads 2A, 2C, 2E and 2G and the heads 2B, 2D, 2F and 2H are alternately arranged on the periphery of a rotating drum 1 at equal intervals. The heights of these heads in the direction of the rotational axis are adjusted to be the same. Reference numerals 2C' and 2G' denote heads with the second azimuth angle which are provided adjacent to the heads 2C and 2G, respectively, with the first azimuth angle, and being at a height having a predetermined difference X (not shown) in height therefrom. The heads 2C' and 2G' are arranged so as to have substantially the same trace locus as that of the heads 2C and 2G when a tape is moved at a predetermined speed of ½ $V_T$, as shown in FIG. 6, which shows the case of the head 2C'. Reference numeral 3 denotes the magnetic tape which is wound around the rotating drum 1 for 180°+α.

In this arrangement, when the magnetic tape 3 is moved at a speed of $V_T$ while the rotating drum 1 is rotated at a predetermined rotational speed using the eight heads 2A, 2B, 2C, 2D, 2E, 2F, 2G and 2H, and when four of the eight heads, which simultaneously contact the tape, are successively selected for recording four signals, the track pattern shown in FIG. 2 is obtained, as in the above-described conventional example.

When the tape speed is then set to ½ $V_T$, and when two of the four heads 2A, 2C', 2E and 2G', which simultaneously contact the tape, are successively selected for recording two signals, the track pattern shown in FIG. 6 is obtained. Namely, although the track angle is only slightly changed, the track pitch T is the same as that at the standard speed, and the S/N ratio of the recorded and reproduced signals is constant.

The above arrangement permits recording and reproducing both in a standard speed mode using the heads 2A to 2H and a ½ speed mode using the heads 2A, 2C', 2E and 2G'.

However, in the above arrangement, if recording and reproducing are performed at ¼ speed by further decreasing the bit rate, further consideration must be made for keeping the track pitch constant.

Namely, a track pattern with a substantially constant track pitch can be obtained when the heads 2C and 2G' or 2C' and 2G are used. However, since the difference X in height, which is provided to correspond with the phase interval between the heads 2C and 2C' and the heads 2G and 2G' is suitable for the ½ speed mode, the difference in height is too large by ½ X for the ¼ speed mode achieved by decreasing the bit rate, thereby producing a track pitch increased by ½ X and a track pitch decreased by ½ X.

When the recording density can be increased by improving the characteristics of the tape and heads, the track pitch is decreased by decreasing the tape speed so that the recording time can be increased. However, since an appropriate difference X in height is determined in proportion to the track pitch, nonuniformity significantly occurs in the track pitch in the above example. It is thus necessary to add a head for a long-term mode.

SUMMARY OF THE INVENTION

Accordingly, an object of the present invention is to further improve the above apparatus and to provide a rotary head type recording and/or reproducing apparatus which permits a uniform track pitch to be obtained at both ½ speed and ¼ speed.

In order to achieve the object, a rotary head type recording and/or reproducing apparatus in accordance with an embodiment of the present invention comprises at least one group comprising two heads having a first azimuth, and two heads having a second azimuth, which are alternately arranged on the periphery of a rotating drum so as to be used for recording and/or reproducing at a tape speed $V_T$. In the apparatus, another head having the second azimuth (referred to as the second azimuth head) is further arranged adjacent to one of the two heads having the first azimuth, in each group, so as to be used for recording and/or reproducing at a tape speed of ½ $V_T$, together with the other head having the first azimuth. The position of the head adjacent to the additional second head is deviated from an equal-interval arrangement position on the periphery of the rotating drum by a predetermined amount so that recording and/or reproducing can be performed at a tape speed of at least ¼$V_T$.

In the above arrangement, the head for the ½ speed is provided adjacent to one of the four heads for the highest bit rate mode, and the positions of the two adjacent heads relative to the positions of the other heads, which are simultaneously used at the ½ speed, are offset from the positions at equal intervals so that a uniform track pitch can be obtained at both the ½ speed and the ¼ speed.

A second object of the present invention is to further improve the above apparatus and to provide a rotary head type recording and/or reproducing apparatus which permits a decrease in the offset between the track pitches in respective modes.

In order to achieve the second object, a rotary head-type recording and/or reproducing apparatus in accordance with an embodiment of the present invention comprises first and second heads having different azimuths and arranged adjacent to each other, a third head having the same azimuth as that of one of the first and second heads and arranged at a position offset from a position located 180° from the head having the same azimuth by a predetermined phase with a difference in height therefrom, and fourth and fifth heads having an azimuth different from that of the third azimuth and arranged at positions at substantially the same phase distance from one of the first and second heads with the same difference in height therefrom.

This arrangement permits recording and/or reproducing with a substantially uniform track pitch of at least two kinds in any one of the following modes (1) to (3):

(1) A lowest bit rate mode in which the first and second adjacent heads having different azimuth angles are alternately used for each rotation.

(2) A double bit rate mode in which the third head arranged at a position offset, by a predetermined phase, from the position located 180° from one of the first and second heads, and the other head of the first and second heads are used.

(3) A quadruple bit rate mode in which one of the first and second heads, the fourth and fifth heads arranged at positions offset, by a predetermined phase, from a position located 90° from the one of the first and second heads, and the third head are used.

In one aspect, the present invention provides an apparatus for recording information on and/or reproducing information from a recording medium using a plurality of heads. The apparatus includes a rotating drum for mounting the plurality of heads, a first head with a head gap having a first azimuth angle, a second head with a head gap having a second azimuth angle, a third head with a head gap having the first azimuth angle, a fourth head with a head gap having the second azimuth angle, and a fifth head with a head gap having the second azimuth angle. The fifth head is arranged adjacent to the first head and is not disposed at a position rotated 180° from the third head. The first to fourth heads are successively arranged on the periphery of the rotating drum at one of (i) a respective reference position and (ii) a respective offset position that is offset from a corresponding reference position in a rotational direction of the drum, the reference positions of the heads being arranged at equal internals on the periphery of the drum and at least the first head being disposed at the respective offset position, and the heads record information on the recording medium in accordance with information signals and/or reproduce information from the recording medium.

In another aspect, the present invention provides a method for recording information on and/or reproducing information from a tape-like recording medium using a rotating drum that mounts a plurality of heads including a first head with a head gap having a first azimuth angle, a second head with a head gap having a second azimuth angle, a third head with a head gap having the first azimuth angle, a fourth head with a head gap having the second azimuth angle, and a fifth head with a head gap having the second azimuth angle. The method includes the steps of arranging the first to fourth heads successively on the periphery of the rotating drum at one of (i) a respective reference position and (ii) a respective offset position that is offset from a corresponding reference position in a rotational direction of the drum, the reference positions of the heads being arranged at equal intervals on the periphery of the drum and at least the first head being disposed at the respective offset position, and recording information on and/or reproducing information from the recording medium by using the first, second, third and fourth heads when the recording medium is moved at a first speed, and by using the third and fifth heads when the recording medium is moved at a speed of one-half of the first speed.

In yet another aspect, the present invention provides an apparatus for recording information on and/or reproducing information from a recording medium using a plurality of heads. The apparatus includes a rotating drum for mounting the plurality of heads, a first head with a head gap having a first azimuth angle, a second head with a head gap having a second azimuth angle, a third head with a head gap having the first azimuth angle, a fourth head with a head gap having the second azimuth angle, and a fifth head with a head gap having the second azimuth angle. The fifth head is arranged adjacent to the first head. The first to fourth heads are successively arranged on the periphery of the rotating drum, the third head is arranged at a position offset by a predetermined amount from a position located 180° from the first head, and each of the heads are disposed at one of (i) a respective reference position and (ii) a respective offset position that is offset from a corresponding reference position in a rotational direction of the drum, the reference positions of the heads being arranged at equal intervals on the periphery of the drum and at least the first head being disposed at the respective offset position and the heads record information on the recording medium in accordance with information signals and/or reproduce information from the recording medium.

BRIEF DESCRIPTION OF THE DRAWINGS

Like reference numerals have been used throughout the figures for like or corresponding elements.

DESCRIPTION OF THE PREFERRED EMBODIMENTS.

Figure 1:
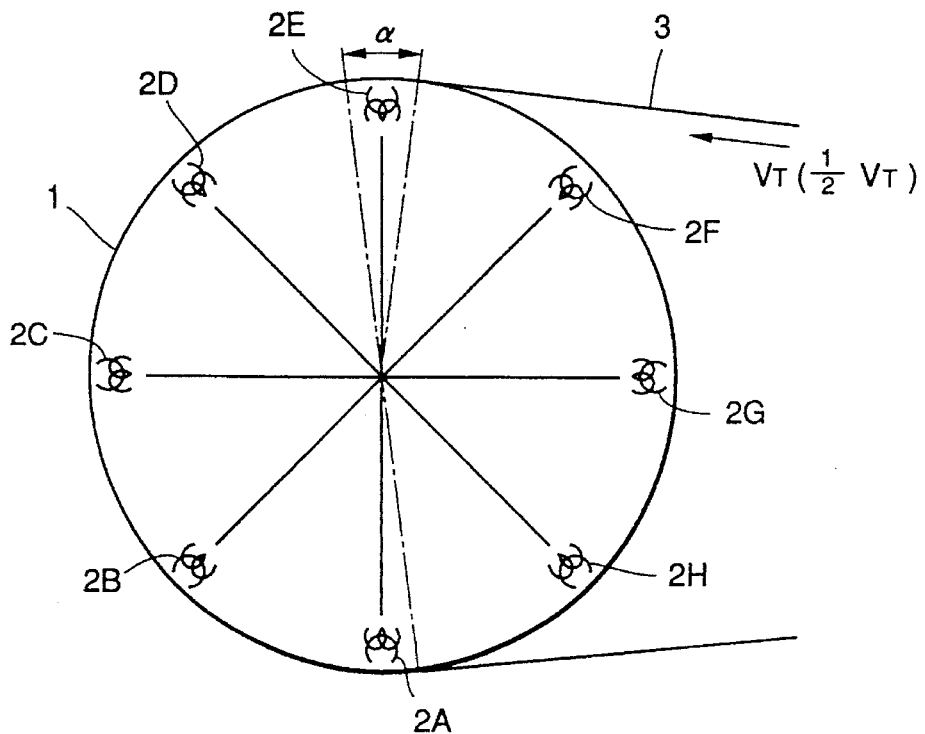
FIG. 1 is a drawing showing a typical example of a rotary head type recording and/or reproducing apparatus, in which eight heads are arranged on a rotating drum.
Figure 2:
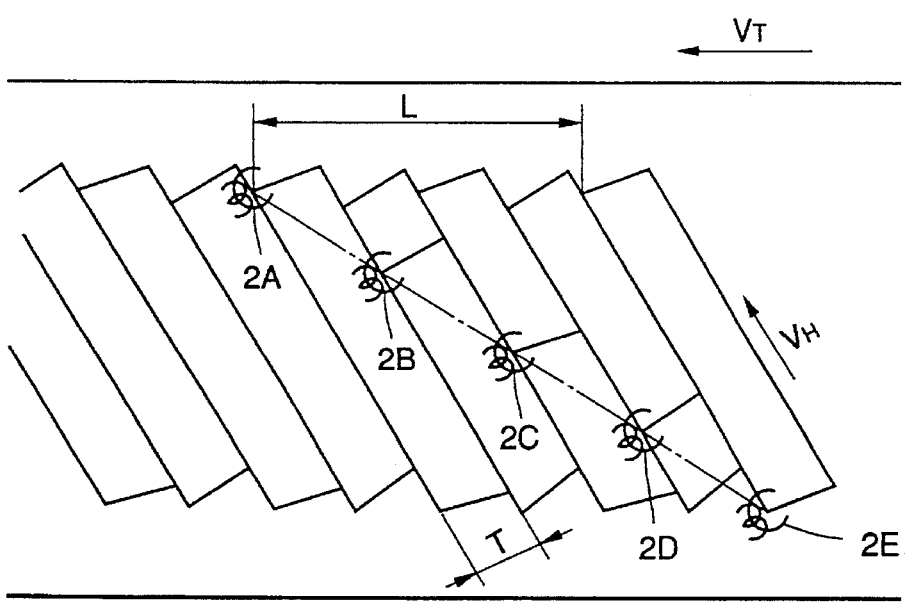
FIG. 2 is a drawing showing a track pattern obtained when four of the rotary heads shown in FIG. 1 are used for recording on a tape which is moved at a tape feed speed $V_T$ by the rotary heads.
Figure 3:
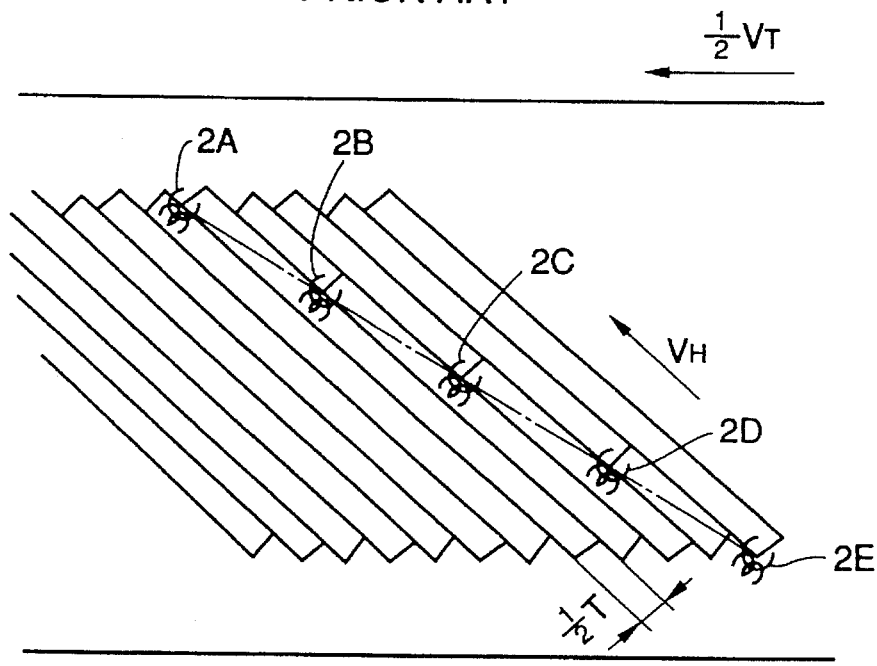
FIG. 3 is a drawing showing a track pattern obtained when the tape feed speed $V_T$ is halved.
Figure 4:
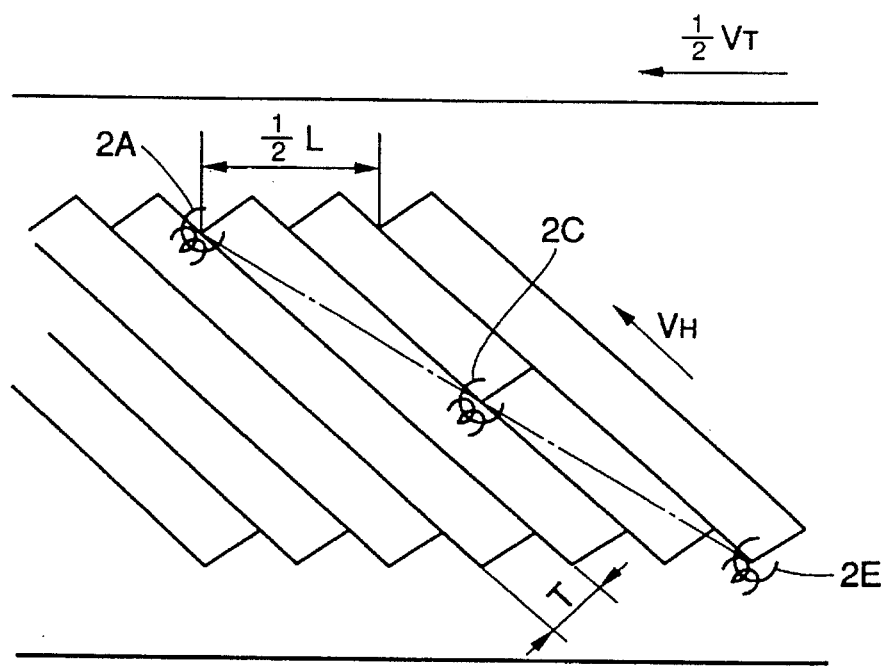
FIG. 4 is a drawing showing a track pattern obtained when the tape feed speed $V_T$ is halved, and the number of the heads used is also halved.
Figure 5:
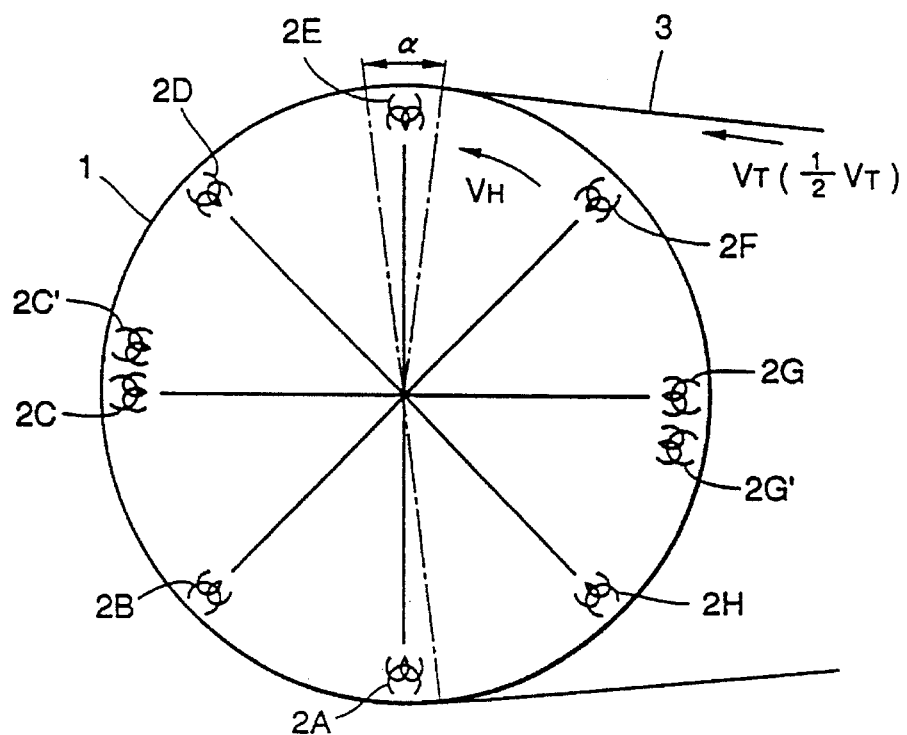
FIG. 5 is a drawing showing an arrangement of heads in a rotary head type recording and/or reproducing apparatus, which has previously been proposed by the inventors.
Figure 6:
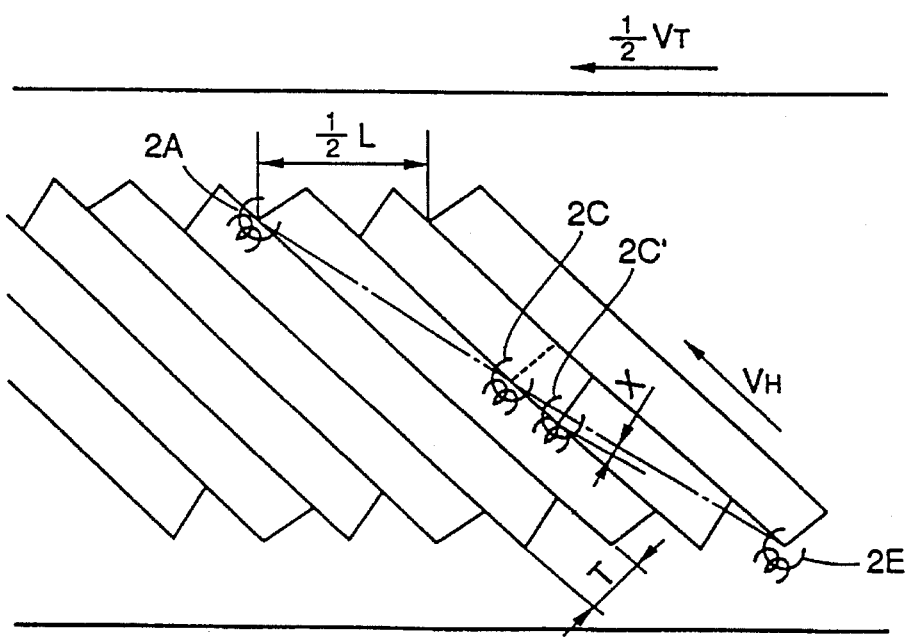
FIG. 6 is a drawing corresponding to FIG. 4 and showing a track pattern obtained when the rotary heads shown in FIG. 5 are used for recording on a tape.
Figure 7:
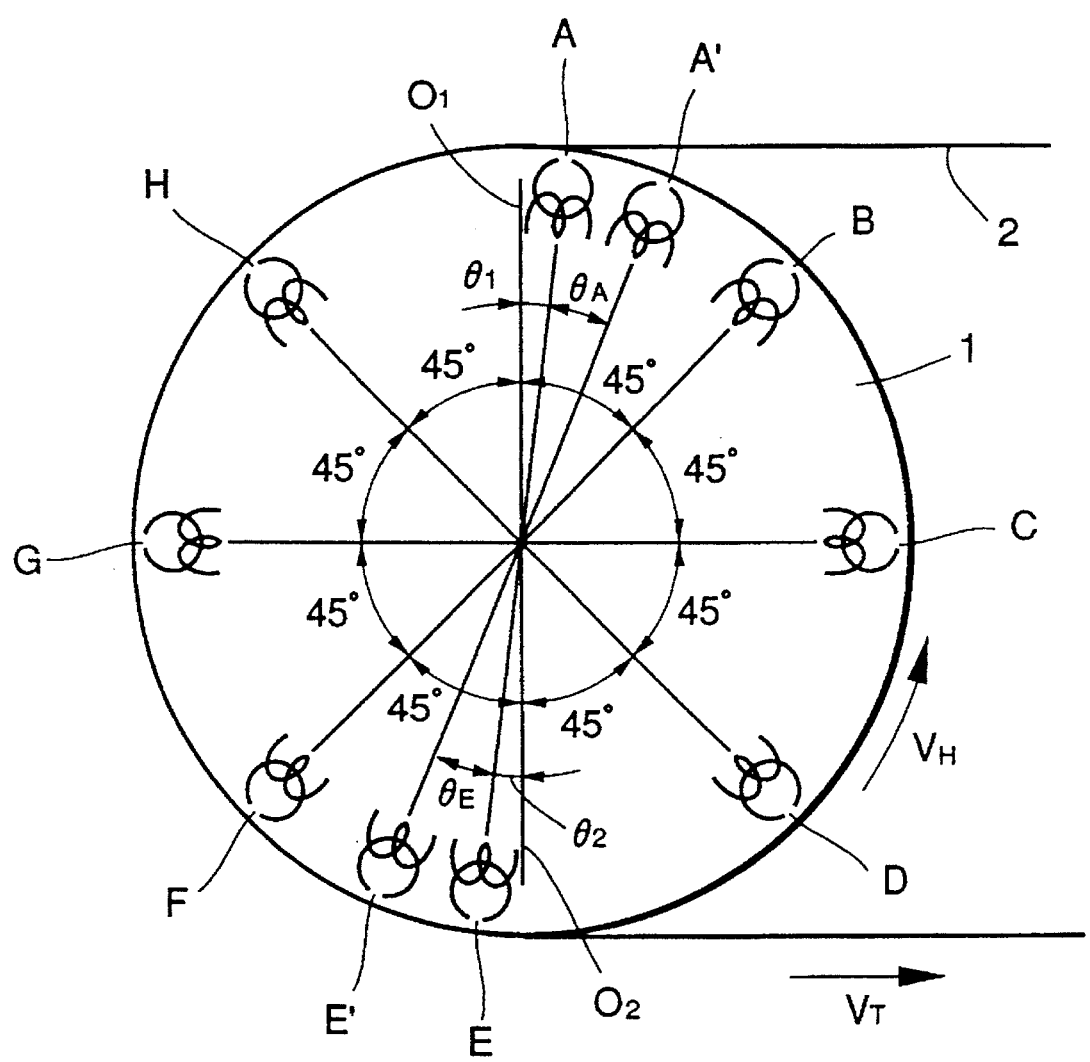
FIG. 7 is a top view of rotary heads in a rotary head type recording and/or reproducing apparatus in accordance with a first embodiment of the present invention.
Figure 8:
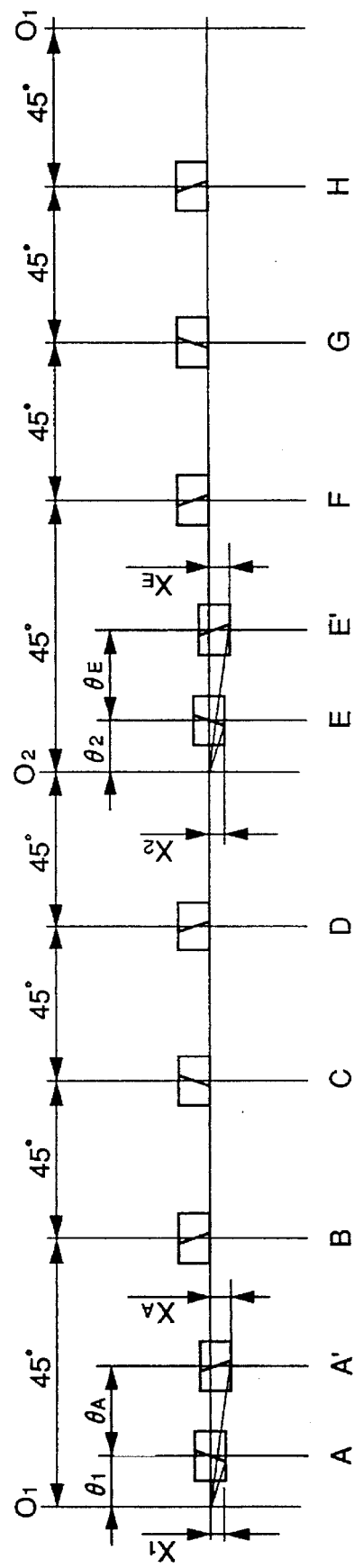
FIG. 8 is a side development of the rotary heads in accordance with the first embodiment of the present invention.

FIGS. 7 and 8 are a top view and a side development, respectively, of rotary heads of a rotary head type recording and/or reproducing apparatus, in accordance with a first embodiment of the present invention.

In FIG. 7, reference characters A to H, A' and E' each denote a magnetic head, reference numeral 1 denotes a drum, and reference numeral 2 denotes a magnetic tape. The magnetic tape 2 is diagonally wound on the rotating drum 1 for about 180° and is moved at a constant speed $V_T$ in the direction shown in the drawing. On the other hand, the rotating drum 1 is rotated at a constant rotational speed of $V_H$. The eight heads A to H are successively used for recording and/or reproduction by scanning the magnetic tape 2 at a constant track pitch $t_p$.

Referring to FIG. 8, of the heads A to H, the heads A, C, E and G have a first azimuth angle, and the heads B, D, F and H have a second azimuth angle. The heads B, C, D, F, G and H are arranged at the same height. The heads A and E are provided at positions deviated from arrangement positions $O_1$ and $O_2$ at equal intervals of 45° by amounts of $\theta_1$ and $\theta_2$, respectively, and the lower ends thereof are at heights with differences $X_1$ and $X_2$, respectively, in level from the height of the heads B, C, D, F, G and H so that recording can be made with a constant pitch.

With a track pitch $t_p$ at the tape speed $V_T$, a uniform pitch is obtained when the differences $X_1$ and $X_2$ in height have the following relations to the phases $\theta_1$ and $\theta_2$, respectively:

$$X_1 = \frac{\theta_1}{45°} \times t_p \quad (1)$$

$$X_2 = \frac{\theta_2}{45°} \times t_p \quad (2)$$

A mode of recording and/or reproducing at a ½ tape speed (½$V_T$) using four heads with the same track pitch $t_p$ is now considered. The two heads A' and E' having a second azimuth angle are arranged at positions deviated from the heads A and E by amounts $\theta_A$ and $\theta_E$ with differences $X_A$ and $X_E$, respectively, in height therefrom so that recording and/or reproducing can be made with a uniform pitch by using the heads A', C, E' and G. At this time, the relations between the differences $X_A$ and $X_E$ in height and the deviations $\theta_A$ and $\theta_E$ are expressed as follows:

$$X_A = \frac{(\theta_1 + \theta_A)}{90°} \times t_p \quad (3)$$

$$X_E = \frac{(\theta_2 + \theta_E)}{90°} \times t_p \quad (4)$$

A mode of recording and/or reproducing at a tape speed of ¼$V_T$ using two heads is considered. Since two heads at about 180° having different azimuth angles may be used, the heads A' and E or A and E' may be used. In this embodiment, the heads A' and E are used. In order to obtain a uniform pitch, the differences $X_A$ and $X_2$ in height and the phases $\theta_1$, $\theta_A$ and $\theta_2$ may have the relations expressed by equation (5) below. When equations (2), (3) and (5) are solved as simultaneous equations, equation (5)' below is obtained.

$$X_A - X_2 = \frac{(\theta_1 + \theta_A - \theta_2)}{90°} \times t_p \quad (5)$$

$$\theta_A + \theta_1 = 3\theta_2 \quad (5)'$$

Since the phase difference $\theta_A$ between the heads A and A' cannot be set to zero, it is found from the equations that the differences $\theta_1$ and $\theta_2$ cannot be simultaneously set to zero. For example, if $\theta_1=0$, and if the phase differences between the heads A and A', and E and E' are the same in consideration of equalization of parts, the following equations are derived from the above equations:

$$\theta_1 = 0, \theta_2 = \frac{1}{3} \theta_A, X_1 = 0, X_2 = \frac{\theta_A}{135°} \times t_p$$

$$X_A = \frac{\theta_A}{90°} \times t_p, X_E = \frac{2\theta_A}{135°} \times t_p$$

In this embodiment, a uniform track pitch can be obtained even in a mode of recording and/or reproducing at a ⅛ speed (⅛$V_T$). Namely, in this mode, the heads A and A' or the heads E and E' are alternately used for each rotation for recording and/or reproducing. In this case, when the heads A and A' are used, a condition for obtaining a uniform track pitch is expressed by equation (6) below. Equation (6)' is obtained from the above equations (1), (3) and (6). When equation (6)' is substituted in equation (5)', equation (7) below is obtained.

$$X_A - X_1 = \frac{\theta_A}{360°} \times t_p \tag{6}$$

$$\theta_1 = \frac{3}{4} \theta_A \tag{6)'}$$

$$\theta_2 = \frac{7}{12} \theta_A \tag{7}$$

Namely, since the differences $\theta_1$ and $\theta_2$ cannot both be set to zero, the following equations are obtained. Assuming that $\theta_E = \theta_A$, $X_E$ is also determined.

$$X_1 = \frac{\theta_A}{60°} \times t_p, X_2 = \frac{7\theta_A}{540°} \times t_p, X_A = \frac{7\theta_A}{360°} \times t_p$$

$$X_E = \frac{19\theta_A}{1080°} \times t_p$$

When the heads E and E' are used in the ⅛ $V_t$ mode, equation (8) below is obtained. Equation (8)' is obtained from the above equations (2), (4) and (8). Assuming that $\theta_A = \theta_E$, when this equation is substituted in equation (5)', equation (9) below is obtained. Each of $X_1$, $X_2$, $X_A$ and $X_E$ is thus determined.

$$X_E - X_2 = \frac{\theta_E}{360°} \times t_p \tag{8}$$

$$\theta_2 = \frac{3}{4} \theta_E \tag{8)'}$$

$$\theta_1 = \frac{5}{4} \theta_E \tag{9}$$

$$X_1 = \frac{\theta_E}{36°} \times t_p, X_2 = \frac{\theta_E}{60°} \times t_p, X_A = \frac{\theta_E}{40°} \times t_p,$$

$$X_E = \frac{7\theta_E}{360°} \times t_p$$

In any one of the cases, a uniform track pitch can be obtained in each of the 1, ½, ¼ and ⅛ modes.

This embodiment permits the realization of a uniform pitch in the modes at tape speeds up to ⅛ $V_T$. Although pitch error occurs in a mode at a lower tape speed, $\theta_A = \theta_E$ is sometimes so small that the error can be allowed.

For example, in the above embodiment, assuming that $\theta_A = \theta_E = 12°$, $\theta_2 = 9°$ and $\theta_1 = 15°$ are determined by equations (8)' and (9). Since $X_1 = \frac{1}{3} t_p$, $X_2 = \frac{1}{5} t_p$, $X_A = \frac{3}{10} t_p$ and $X_E = \frac{7}{30} t_p$, and $X_E - X_2 = \frac{1}{30} t_p$.

If the heads E and E' are used once each time the rotating drum is rotated twice in a 1/16 $V_T$ mode, since the condition for obtaining a uniform pitch is $X_E - X_2 = (\theta_E/720°) t_p = \frac{1}{60} t_p$, the pitch error is $\frac{1}{30} t_p - \frac{1}{60} t_p = \frac{1}{60} t_p$. Since this error corresponds to an output difference of $\pm 20 \log_{10}(1 - \frac{1}{60}) =$ ±0.15 dB, there is a great possibility that the error can be tolerated.

The above embodiment concerns the case where $\theta_1 = 0$. Although, in this case, pitch error occurs when the heads A and A' or the heads E and E' are used in the ⅛ $V_T$ mode, the error can be tolerated if $\theta_A = \theta_E$ is sufficiently small.

For example, when $\theta_A = \theta_E = 12°$, since $\theta_1 = 0$, $\theta_2 = 4°$, $X_1 = 0$, $X_2 = \frac{8}{45} t_p$, $X_A = \frac{2}{15} t_p$, and $X_E = \frac{8}{45} t_p$, $X_E - X_2 = \frac{4}{45} t_p$. On the other hand, since the condition for obtaining a uniform pitch at ⅛ $V_T$ is $X_E - X_2 = (\theta_E/360°) t_p = \frac{1}{30} t_p$, the pitch error is $\frac{4}{45} t_p - \frac{1}{30} t_p = \frac{1}{18} t_p$, which corresponds to an output difference of $\pm 20 \log_{10}(1 - \frac{1}{18}) = \pm 0.5$ dB. If this error can be tolerated, this state can be realized.

Figure 9:
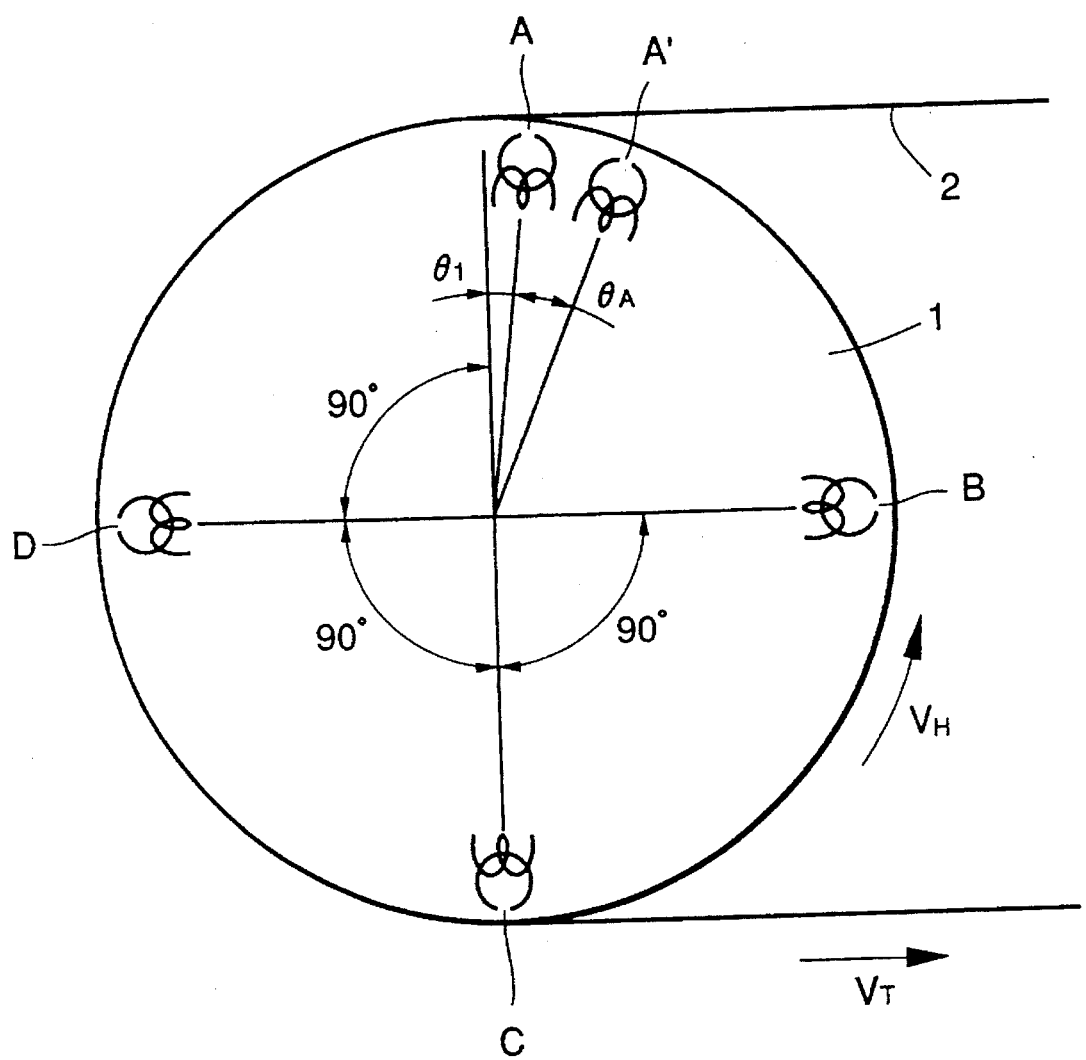
FIG. 9 is a top view of rotary heads in a rotary head type recording and/or reproducing apparatus in accordance with a second embodiment of the present invention.
Figure 10:
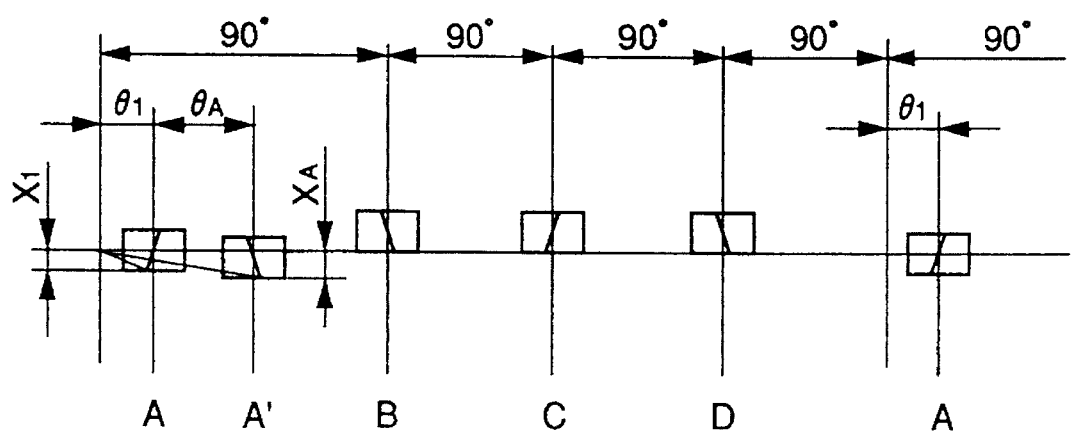
FIG. 10 is a side development of the rotary heads in accordance with the second embodiment of the present invention.

A second embodiment of the present invention is shown in FIGS. 9 and 10. In this embodiment, four heads are used in the highest bit rate mode, and the condition for obtaining a uniform track pitch at each of the tape speeds $V_T$, ½ $V_T$ and ¼ $V_T$ can be determined by the same method as that employed in the first embodiment.

The condition when the heads A, B, C and D are used at the tape speed $V_T$, the condition when the heads A' and C are used at the tape speed ½ $V_T$, and the condition when the heads A and A' are alternately used at the tape speed ¼$V_T$ are expressed by the following equations (10), (11) and (12), respectively:

$$X_1 = \frac{\theta_1}{90°} \times t_p \tag{10}$$

$$X_A = \frac{(\theta_1 + \theta_A)}{180°} \times t_p \tag{11}$$

$$X_A - X_1 = \frac{\theta_A}{360°} \times t_p \tag{12}$$

With the substitution of equations (10) and (11), equation (12) is solved to give $\theta_1 = \frac{1}{2}\theta_A$, $X_1 = (\theta_A/180°) t_p$ and $X_A = (\theta_A/120°) t_p$. If $\theta A$ is determined, the mounting positions of the heads are thus determined.

It is thus found that the use of either four or eight heads at the highest bit rate enables a uniform track pitch to be realized by application of the present invention.

Figure 11:
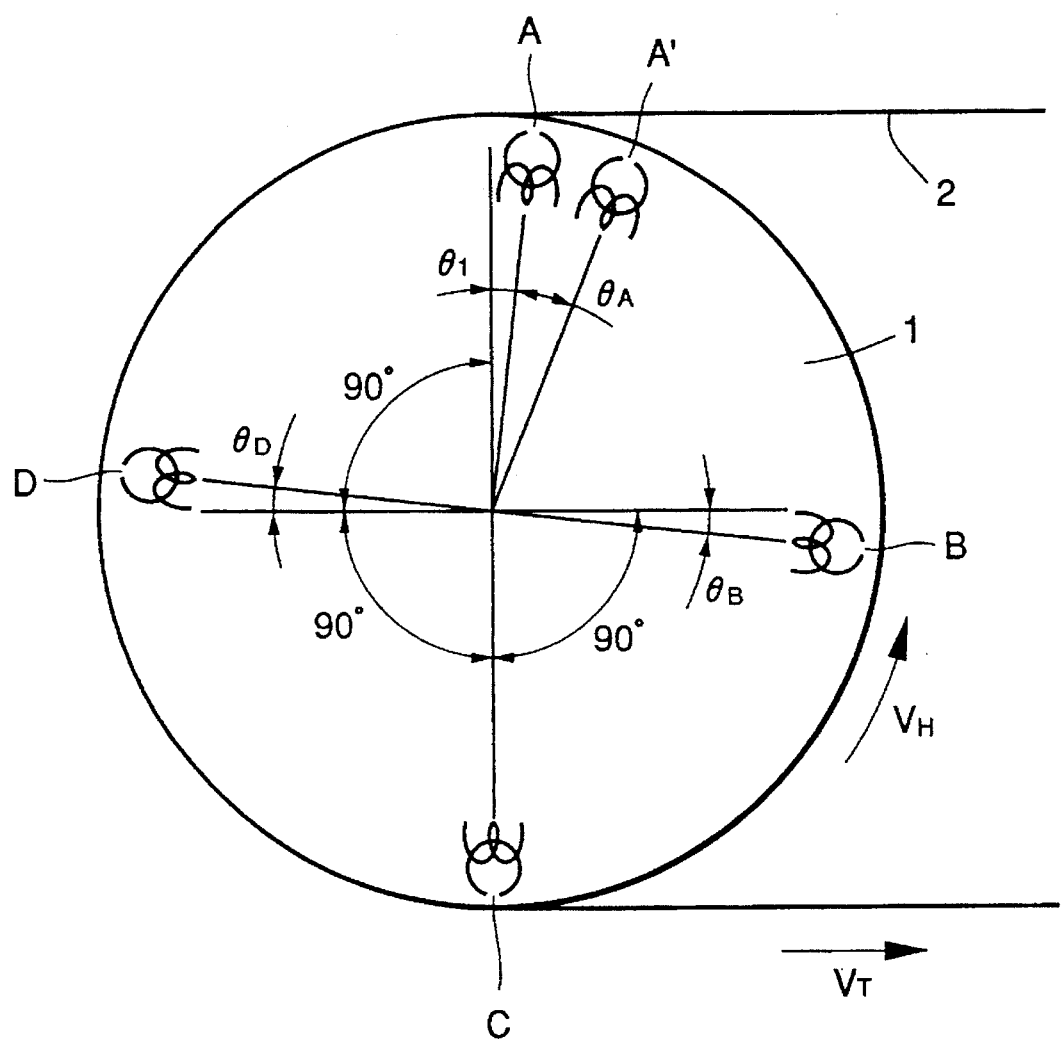
FIG. 11 is a top view of rotary heads in a rotary head type recording and/or reproducing apparatus in accordance with a third embodiment of the present invention.

FIG. 11 shows a third embodiment of the present invention in which the positions of the heads B and D are deviated from the positions at 90° with respect to the head C. Since the heads B and D are used only in the highest bit rate mode, when the heads B and D are arranged at positions with differences of $X_B$ and $X_D$ in height, respectively, which are indicated by the equations $X_B = (\theta_B/90°) t_p$ and $X_D = (\theta_D/90°) t_p$, a uniform pitch can be obtained.

When the positions of the heads B and D are deviated from the position at 90°, as described above, since the differences $X_B$ and $X_D$ in height are increased, the positions of the heads B and D relative to the track are changed during reproduction at the ½ or ¼ tape speed. For example, when $\theta_B = 90° - \theta_A$, and when the difference $X_B$ in height is close to the track pitch, the output from the track adjacent to the track reproduced by the head C is obtained from the head B. When the output of the head A' is decreased due to the clogging of the head or the like, the output of the head B is used. Since the data of adjacent tracks can be simultaneously obtained from the heads B and C during special reproduction such as search or the like, the image quality can possibly be improved. There is also the advantage that output can be checked by simultaneously reproducing during recording.

As described above, in this embodiment, a head is added, for the speed of ½ of the speed at the highest bit rate, adjacent to one of the four heads. The two adjacent heads are arranged at positions deviated from positions at equal intervals relative to the other heads simultaneously used at the ½ speed so that a uniform track pitch can constantly be obtained not only at the ½ speed but also at the ¼ speed and ⅛ speed. This embodiment thus has the effect of enabling a high recording density to be maintained in any one of the bit rate modes.

This embodiment concerns the case when a track pattern is formed with the same track pitch in each of the bit rate modes including the ½ speed mode, ¼ speed mode and ⅛ speed mode.

The fourth embodiment described below concerns the case when the track pitch is decreased for long-term recording in the same bit rate mode, and the case when the track pitch (track width) is increased for improving the reliability of recording and reproduction. In order to realize both cases, the arrangement of the heads is determined as described below.

In contrast with the description of the above embodiment, the lowest bit rate mode is first described for the sake of simplicity.

Figure 12:
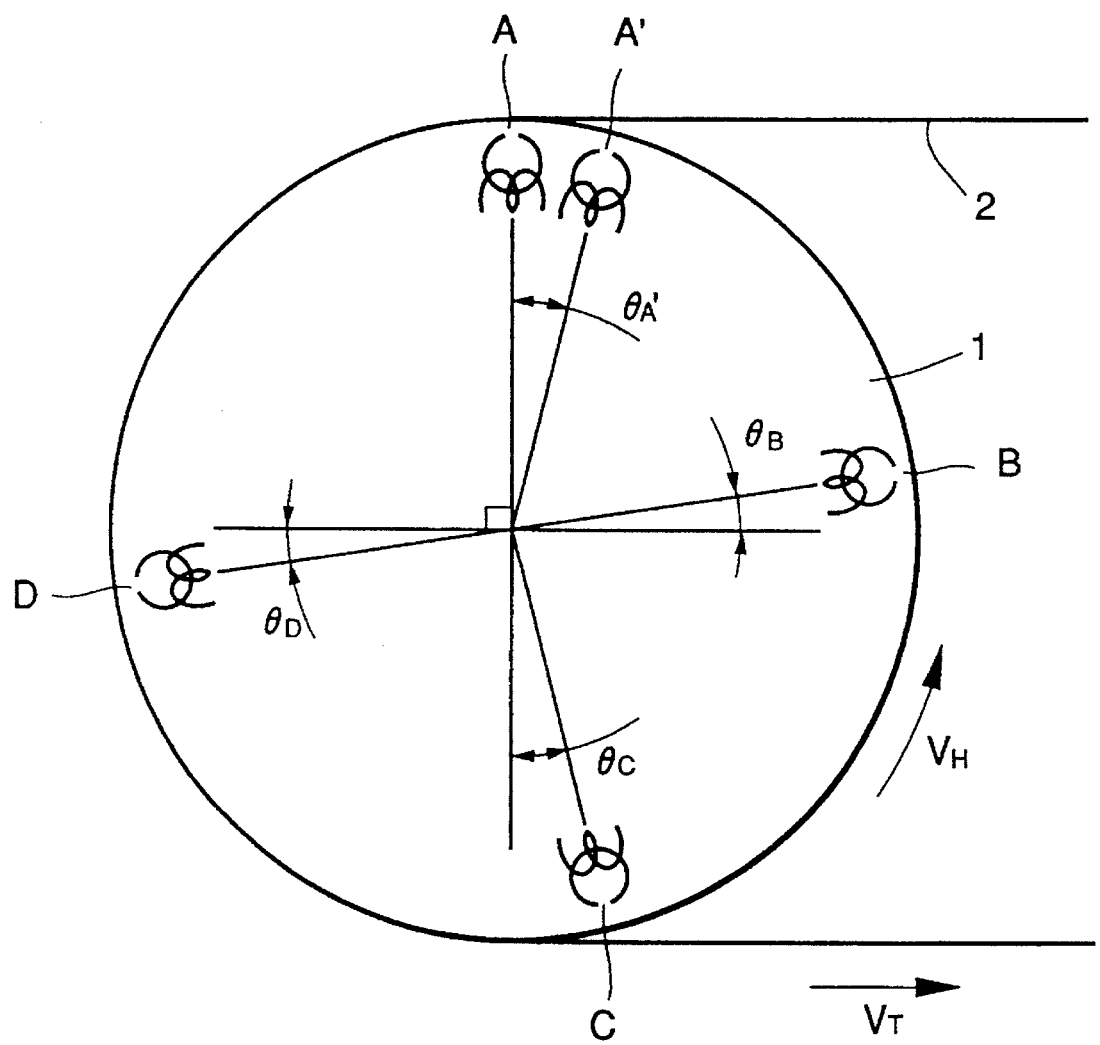
FIG. 12 is a top view of rotary heads in a rotary head type recording and/or reproducing apparatus in accordance with a fourth embodiment of the present invention.
Figure 13:
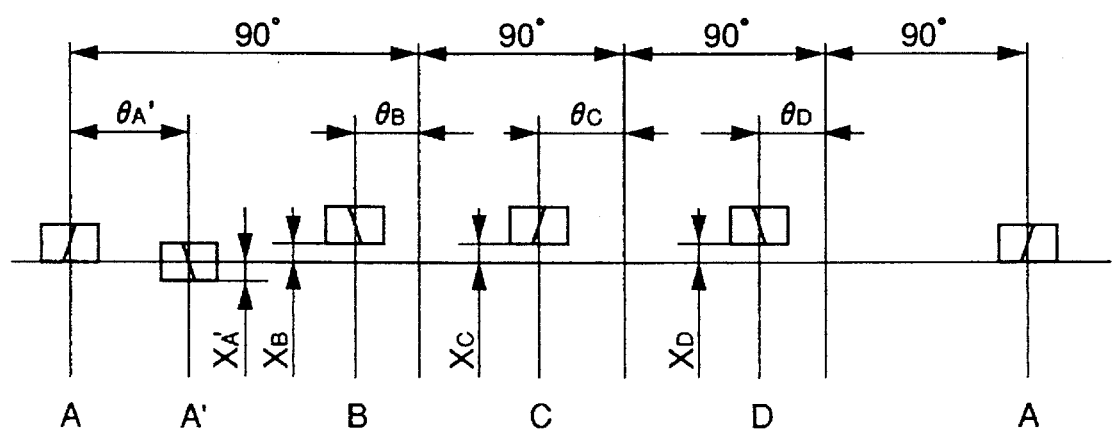
FIG. 13 is a side development of the rotary heads in accordance with the fourth embodiment of the present invention.
Figure 14:
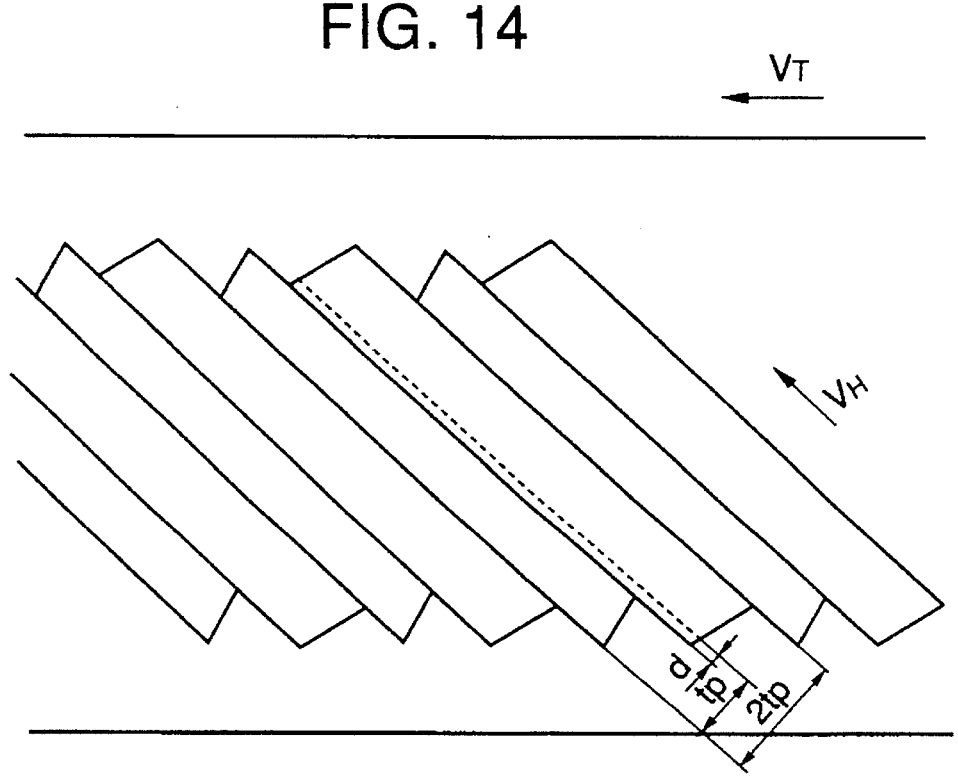
FIG. 14 is a drawing showing a track pattern obtained when a tape is moved at a speed $V_T$ in the fourth embodiment.
Figure 15:
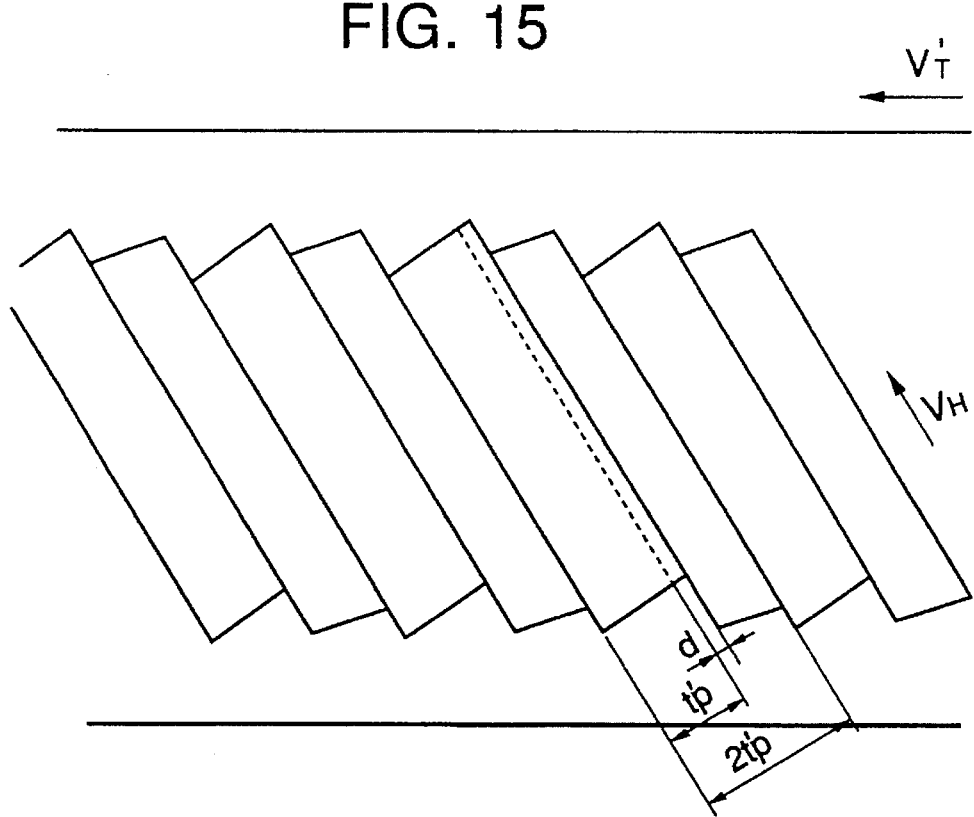
FIG. 15 is a drawing showing a track pattern obtained when a tape is moved at a speed $V_T'$ higher than $V_T$ in the fourth embodiment.

FIGS. 12 and 13 show the arrangement of the heads in the fourth embodiment. FIGS. 14 and 15 show the track patterns obtained when the tape is moved at tape feed speeds $V_T$ and $V_T'$, respectively, which have the relation, $V_T > V_T'$.

In a mode (referred to as "$V_T$ mode") which alternately uses heads A and A' for each rotation for recording at a tape speed $V_T$ and an average track pitch of $t_p$, the difference $d_1$ between the average track pitch $t_p$ and the track pitch determined by the mounting phase $\theta_A'$ of the head A', the difference $X_A'$ in height thereof relative to the head A and the overwrite by the lower end of the head A' is shown in FIG. 14 and indicated by the following equation:

$$d_1 = \frac{\theta_A'}{360°} \times t_p - X_A' \tag{21}$$

Similarly, in a mode ($V_T'$ mode) using the heads A and A' for recording at an average track pitch $t_p'$ and a tape speed $V_T'$ (=a×$V_T$) slightly higher than that of the $V_T$ mode, the difference $d_1'$ from the average track pitch $t_p'$ is shown in FIG. 15 and is indicated by the following equation:

$$d_1' = \frac{\theta_A'}{360°} \times t_p' - X_A' \tag{22}$$

$$= \frac{\theta_A'}{360°} \times a \times t_p - X_A' \tag{22'}$$

Since $\theta_A'$ cannot be decreased to 0, it is apparent that $d_1$ and $d_1'$ cannot simultaneously be decreased to 0. It is thus thought to minimize the effects of the differences $d_1$ and $d_1'$ of the track pitches in both modes. The possible conditions for minimizing the effects include the following three conditions:

(A) The pitch errors produced in both modes are uniform.

$$d_1 + d_1' = 0 \tag{23}$$

(B) The output differences produced in both modes are uniform.

$$d_1 \times a + d_1' = 0 \tag{24}$$

(C) The pitch error in the mode with a smaller average track pitch is zero.

$$d_1 = 0$$

The condition (A) is the optimum condition for the case when although the output difference in the $V_T$ mode is greater than that in the $V_T'$ mode, the mechanical tracking margin during compatible reproduction is given priority.

The condition (B) is the optimum condition for the case when both modes are averaged.

The condition (C) is the optimum condition for the case when the output margin in the $V_T'$ mode is sufficiently large.

The medium condition of the conditions (A), (B) and (C), i.e., the condition below, may actually be satisfied in accordance with the apparatus used.

$$d_1 \times a' + d_1' = 0 \tag{25}$$

wherein a'>1.

Although a case when the condition (B) is performed is described below, the same as that described below can, of course, be applied to any of the cases.

With the substitution of the equations (21) and (22)' the equation (24) is rearranged to give the following equations:

$$X_A' = \frac{\theta_A'}{180°} \times \frac{a}{a+1} \times t_p \tag{26}$$

$$\frac{d_1}{t_p} = -\frac{d_1'}{t_p'} = \frac{\theta_A'}{360°} \times \frac{1-a}{1+a} \tag{27}$$

The track pitch deviations $d_2$ and $d_2'$ determined by the lower end of the head A' in the double speed modes, i.e., the 2 $V_T$ mode and 2 $V_T'$ mode, in which the heads A' and C are used, are then determined. Since the head C is arranged at a position deviated by $\theta_C$ from the position at 180° with respect to the head A, the head A' is deviated by $\theta_C + \theta_A'$ from the position at 180° with respect to the head C. The head C also has the difference $X_C$ in height from the head A. Therefore the deviations $d_2$ and $d_2'$ are as follows:

$$d_2 = \frac{\theta_C + \theta_A'}{180°} \times t_p - X_C - X_A' \tag{28}$$

$$d_2' = \frac{\theta_C + \theta_A'}{180°} \times t_p' - X_C - X_A' \tag{29}$$

$$= \frac{\theta_C + \theta_A'}{180°} \times a \times t_p - X_C - X_A' \tag{29'}$$

The condition (B) is expressed by the following equation:

$$d_2 \times a + d_2' = 0 \tag{30}$$

With the substitution of equations (26), (28) and (29)', equation (30) is rearranged to give the following equations:

$$X_C = \frac{2\theta_C + \theta_A'}{180°} \times \frac{a}{a+1} \times t_p \tag{31}$$

$$\frac{d_2}{t_p} = -\frac{d_2'}{t_p'} = \frac{\theta_C + \theta_A'}{180°} \times \frac{1-a}{1+a} \tag{32}$$

In the quadruple speed modes, i.e., the 4 $V_T$ mode and the 4 $V_T'$ mode, which use the heads A, B, C and D, the track pitch deviations $d_3$ and $d_3'$, $d_4$ and $d_4'$, $d_5$ and $d_5'$, and $d_6$ and $d_6'$ which are determined by the lower ends of the heads B, C, D and A, respectively, are determined. Since the head B is arranged at a position deviated by $\theta_A$ from the position at 90° with respect to the head A at a height $X_B$ from the head A, and the head C is arranged at a position deviated by $\theta_C$ at a height $X_C$ from the head A, the following equations are obtained:

$$d_3 = -\frac{\theta_B}{90°} \times t_p + X_B \tag{33}$$

$$d_3' = -\frac{\theta_B}{90°} \times t_p' + X_B \tag{34}$$

$$= -\frac{\theta_B}{90°} \times a \times t_p + X_B \quad (34)'$$

$$d_4 = -\frac{\theta_C}{90°} \times t_p + X_C - d_3 \quad (35)$$

$$d_4' = -\frac{\theta_C}{90°} \times t_p' + X_C - d_3' \quad (36)$$

$$= -\frac{\theta_C}{90°} \times a \times t_p + X_C - d_3' \quad (36)'$$

As seen from equations (35) and (36)' since $d_3+d_4$, and $d_3'+d_4'$ are determined by $\theta_C$ and $X_C$ alone, the absolute value of each of $d_3$, $d_3'$, $d_4$ and $d_4'$ can be minimized by determining $\theta_B$ and $X_B$ so that $d_3=d_4$, and $d_3'=d_4'$. Equations (37) and (38) below are thus obtained from the equations (35) and (36)', respectively. The equations (33) and (34)' and the equations (37) and (38) are solved to give the equations (39) and (40) below, respectively.

$$d_3 = d_4 = \frac{d_3 + d_4}{2} = -\frac{\theta_C}{180°} \times t_p + \frac{X_C}{2} \quad (37)$$

$$d_3' = d_4' = \frac{d_3' + d_4'}{2} = -\frac{\theta_C}{180°} \times a \times t_p + \frac{X_C}{2} \quad (38)$$

$$\theta_B = \frac{1}{2} \theta_C \quad (39)$$

$$X_B = \frac{1}{2} X_C \quad (40)$$

On the other hand, since the head D is arranged at a position deviated by $\theta_D$ from the position at 90° with respect to the head A at a height $X_D$ therefrom, $d_5$, $d_5'$, $d_6$ and $d_6'$ are indicated by the equations below. Since equation (45) below is obtained from equations (41) and (43), and equation (46) below is obtained from equations (42)' and (44)', equations (47) and (48) below are established by the same method as that applied to $d_3$ and $d_4$. Therefore, equations (49) and (50) below are obtained from equations (43) and (44)' and equations (47) and (48), respectively.

$$d_5 = -\frac{\theta_D - \theta_C}{90°} \times t_p + X_D - X_C \quad (41)$$

$$d_5' = -\frac{\theta_D - \theta_C}{90°} \times t_p' + X_D - X_C \quad (42)$$

$$= -\frac{\theta_D - \theta_C}{90°} \times a \times t_p + X_D - X_C \quad (42)'$$

$$d_6 = \frac{\theta_D}{90°} \times t_p - X_D \quad (43)$$

$$d_6' = \frac{\theta_D}{90°} \times t_p' - X_D \quad (44)$$

$$= \frac{\theta_D}{90°} \times a \times t_p - X_D \quad (44)'$$

$$d_5 + d_6 = \frac{\theta_C}{90°} \times t_p - X_C \quad (45)$$

$$d_5' + d_6' = \frac{\theta_C}{90°} \times a \times t_p - X_C \quad (46)$$

$$d_5 = d_6 = \frac{d_5 + d_6}{2} = \frac{\theta_C}{180°} \times t_p - \frac{X_C}{2} \quad (47)$$

$$d_5' = d_6' = \frac{d_5' + d_6'}{2} = \frac{\theta_C}{180°} \times a \times t_p - \frac{X_C}{2} \quad (48)$$

$$\theta_D = \frac{1}{2} \theta_C \quad (49)$$

$$X_D = \frac{1}{2} X_C \quad (50)$$

If the condition (B) is applied to $d_4$ and $d_4'$, equations (51) and (52) below are obtained, and equation (53) below is obtained from equations (51) and (52). Equation (54) below is thus obtained.

$$d_4 \times a + d_4' = 0 \quad (51)$$

$$-\frac{\theta_C}{90°} \times a \times t_p + X_C = 0, X_C = \frac{\theta_C}{90°} \times a \times t_p \quad (52)$$

$$\theta_C = \frac{\theta_A'}{2a} \quad (53)$$

$$X_C = \frac{\theta_A'}{180°} \times t_p \quad (54)$$

From these equations, the position and the pitch deviation of each of the heads is determined by $\theta_A'$, $a$ and $t_p$, as shown below.

$$X_A' = \frac{\theta_A'}{180°} \times \frac{a}{a+1} \times t_p \quad (26)$$

$$\theta_B = \theta_D = \frac{\theta_A'}{4a}, \theta_C = \frac{\theta_A'}{2a} \quad (55)$$

$$X_B = X_D = \frac{\theta_A'}{360°} \times t_p, X_C = \frac{\theta_A'}{180°} \times t_p \quad (56)$$

$$\frac{d_1}{t_p} = \frac{-d_1'}{t_p'} = \frac{\theta_A'}{360°} \times \frac{1-a}{1+a} \quad (27)$$

$$\frac{d_2}{t_p} = \frac{-d_2'}{t_p'} = \frac{\theta_A'}{360°} \times \frac{(1+2a)(1-a)}{a(1+a)} \quad (57)$$

$$\frac{d_3}{t_p} = \frac{d_4}{t_p} = -\frac{d_5}{t_p} = -\frac{d_6}{t_p} = -\frac{d_3'}{t_p'} = -\frac{d_4'}{t_p'} \quad (58)$$

$$= \frac{d_5'}{t_p'} = \frac{d_6'}{t_p'} = \frac{\theta_A'}{360°} \times \frac{a-1}{a}$$

For example, when $\theta_A'=15°$ and $a=1.5$, $X_A=\frac{1}{20}t_p$, $\theta_B=\theta_D=2.5°$, $X_B=X_D=\frac{1}{24}t_p$, $\theta_C=1.5°$ and $X_C=\frac{1}{12}t_p$. The right sides of the equations (27), (57) and (58) are thus $-\frac{1}{120}$, $-\frac{1}{45}$ and $\frac{1}{120}$, respectively. Therefore, the increase in the output variation caused by the pitch error produced due to the addition of the $2V_T$, $2V_T'$, $4V_T$ and $4V_T'$ modes is $\pm 20 \log_{10}(1-\frac{1}{45})=\pm 0.20$ dB. This causes no practical problem.

Since the above-described results are obtained by applying the condition (B) to each of the modes, the pitch deviations in the $2V_T$ and $2V_T'$ modes are maximum. However, since the pitch deviations in the $4V_T$ and $4V_T'$ modes, and the pitch deviations in the $2V_T$ and $2V_T'$ modes are determined by $\theta_C$, the pitch deviation in the $2V_T$ or $2V_T'$ mode and the deviation in the $4V_T$ or $4V_T'$ mode is used in place of the application of the condition (B) to the $4V_T$ and $4V_T'$ modes so that the output variation can be further decreased.

Namely, the following equation (59) or (60) is used in place of equation (51):

$$d_2+d_4=0 \quad (59)$$

$$d_2'+d_4'=0 \quad (60)$$

$$\frac{\theta_C + \theta_A'}{180°} \times \frac{1-a}{1+a} - \frac{\theta_C}{190°} + \frac{2\theta_C + \theta_A'}{360°} \times \frac{a}{a+1} = 0$$

$$\theta_C = \frac{2-a}{2a} \theta_A' \quad (61)$$

$$\theta_C = \left(a - \frac{1}{2}\right)\theta_A' \quad (62)$$

Examination of equation (62) shows that when $\theta_C$ is greater than $-\theta_A'$, the pitch deviation in the $2V_T$ mode decreases as $\theta_C$ decreases. Comparison between equations (61) and (62) shows that when $a>1$, $\theta_C$ shown by equation (61) is smaller than that shown by equation (62). The required condition is the equation (59) with $\theta_C$ shown by equation (61). Under the condition, the positions of the heads, and the pitch deviations are given by the following:

$$\theta_B = \theta_D = \frac{2-a}{4a}\theta_A', \theta_C = \frac{2-a}{2a}\theta_A' \quad (63)$$

$$X_B = X_D = \frac{\theta_A'}{180°} \times \frac{1}{a+1} \times t_p \quad$$

$$X_C = \frac{\theta_A'}{90°} \times \frac{1}{a+1} \times t_p \quad (64)$$

$$\frac{d_2}{t_p} = \frac{-d_2'}{t_p'} = \frac{\theta_A'}{360°} \times \frac{(2+a)(1-a)}{a(1+a)} \quad (65)$$

$$\frac{d_3}{t_p} = \frac{d_4}{t_p} = -\frac{d_5}{t_p} = -\frac{d_6}{t_p} \quad (66)$$

$$= \frac{\theta_A'}{360°} \times \frac{(a+2)(a-1)}{a(1+a)}$$

$$\frac{d_3'}{t_p'} = \frac{d_4'}{t_p'} = -\frac{d_5'}{t_p'} = -\frac{d_6'}{t_p'} \quad (67)$$

$$= \frac{\theta_A'}{360°} \times \frac{a(a-1)}{a+1}$$

For example, when $\theta_A' = 15°$ and $a=1.5$, $X_A = \frac{1}{20}t_p$, $\theta_B = \theta_D = 1.2°$, $X_B = X_D = \frac{1}{30}t_p$, $\theta_C = 2.4°$ and $X_C = \frac{1}{15}t_p$. The right sides of the equations (65), (66) and (67) are thus $-\frac{7}{360}$, $\frac{7}{360}$ and $\frac{1}{80}$, respectively. Therefore, the increase in the output variation is $\pm 20 \log_{10}(1-\frac{7}{360}) = \pm 0.17$ dB. This is slightly different from that in the above-described case.

As described above, although an optimum point is present, substantially the same result can be obtained in the vicinity of the optimum point. In practice, $\theta_C$ is set to a value close to this optimum point from the viewpoint of the ease of formation of a head switch timing pulse, the ease of mounting and adjustment of the heads, and the ease of balancing of rotation, and $X_C$, $\theta_B$, $\theta_D$, $X_B$, and $X_D$ may then be determined using the condition (B).

As described above, in this embodiment, since the case at the lowest bit rate is considered as a reference in contrast with the previous embodiment, the tape feed speed is the double speed or the quadruple speed. However, since the bit rate is considered as a reference, the tape speed is a relative speed. On the highest bit rate basis, the tape speed is ½ speed or ¼ speed, and on the medium bit rate basis, the tape speed is ½ speed or double speed.

Furthermore, in this embodiment, the head A' is arranged at a position so as to contact the tape after the head A contacts it. However, even if the head A' is arranged so as to contact the tape before the head A contacts it, the position of each of the heads is determined by the same method as that described above to produce the same results. In addition, although the embodiment concerns the case when the feed direction of the tape is the same as the rotation direction of the heads, the feed direction of the tape may be different from the rotation direction of the heads. The contact angle of the tape is not limited to 180°.

As described above, in this embodiment, the mounting positions of the heads used in the $V_T$ and $V_t'$ ($>V_T$) modes are slightly deviated from the equal interval positions so that the track pitch deviation in each of the modes can be decreased. The embodiment also has the effect of providing an apparatus which can comply with long-term recording and/or reproduction without an increase in the number of the heads used.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for recording information on and/or reproducing information from a recording medium using a plurality of heads, said apparatus comprising:

a rotatable drum for mounting the plurality of heads;

a first head, a second head, a third head, and a fourth head consecutively arranged on the periphery of said rotatable drum in the named order, in one of (i) a rotational direction of said drum and (ii) a direction opposite to the rotational direction of said drum, said first and third heads having a head gap with a first azimuth angle and said second and fourth heads having a head gap with a second azimuth angle, each of said heads being disposed at one of (i) a respective reference position and (ii) a respective offset position that is offset from a corresponding reference position in the rotational direction of said drum, the reference positions of said heads being arranged at equal intervals on the periphery of said drum and at least said first head being disposed at the respective offset position; and a fifth head with a head gap having the second azimuth angle, said fifth head being arranged adjacent to said first head and being not disposed at a position rotated 180° from said third head, and said first through fifth heads being configured to record information on the recording medium in accordance with information signals and/or reproduce information from the recording medium.

2. An apparatus according to claim 1, wherein said second, third and fourth heads are arranged at the respective reference positions.

3. An apparatus according to claim 2, wherein said second, third and fourth heads are arranged at the same position in an axial direction along a rotation axis of said rotatable drum, and said first and fifth heads are respectively offset from that position in the axial direction, by an amount corresponding to the offset of the respective head from the respective reference position.

4. An apparatus according to claim 1, wherein said second and fourth heads are arranged at positions offset by a predetermined amount from the respective reference positions in a direction of rotation of said rotatable drum and in a direction opposite to the direction of rotation of said rotatable drum, respectively.

5. An apparatus according to claim 4, wherein said first, second, fourth and fifth heads are respectively offset from the position of said third head in an axial direction along a rotation axis of said rotatable drum, by an amount corresponding to the offset of the respective head from the respective reference position.

6. An apparatus according to claim 5, wherein the amount of offset of said first head from the respective reference positions is A°, the offset of said second head from the respective reference positions is (90–A)°, and the offset of said second head in a direction along a rotation axis of said rotatable drum is approximately equal to a track pitch formed on the recording medium.

7. An apparatus according to claim 4, wherein said second and fourth heads are arranged at substantially equal distances from said first and third heads, respectively.

8. An apparatus according to claim 1, further comprising a plurality of groups of heads, each comprising said first to fifth heads.

9. A method for recording information on and/or reproducing information from a tape-like recording medium using a rotatable drum that mounts a plurality of heads including a first head with a head gap having a first azimuth angle, a second head with a head gap having a second azimuth angle, a third head with a head gap having the first azimuth angle, a fourth head with a head gap having the second azimuth angle, and a fifth head with a head gap having the second azimuth angle, said method comprising the steps of:

arranging the first to fourth heads consecutively on the periphery of the rotatable drum in the named order, in one of (i) a rotational direction of the drum and (ii) a direction opposite to the rotational direction of the drum, each of said heads being disposed at one of (i) a respective reference position and (ii) a respective offset position that is offset from a corresponding reference position in the rotational direction of said drum, the reference positions of said heads being arranged at equal intervals on the periphery of said drum, at least said first head being disposed at the respective reference position and said fifth head being arranged adjacent to said first head and being not disposed at a position rotated 180° from the third head; and recording information on and/or reproducing information from the recording medium by using the heads arranged on the drum in said arranging step.

10. A method according to claim 9, further comprising alternately using the first and fifth heads for each $2^{n-2}$ rotations of the rotating drum when the recording medium is moved at a speed of $½^n$ (n>2) of the first speed.

11. An apparatus for recording information on and/or reproducing information from a recording medium using a plurality of heads, said apparatus comprising:

a rotatable drum for mounting the plurality of heads;

a first head, a second head, a third head, and a fourth head consecutively arranged on the periphery of said rotatable drum in the named order, in one of (i) a rotational direction of said drum and (ii) a direction opposite to the rotational direction of said drum, said first and third heads having a head gap with a first azimuth angle and said second and fourth heads having a head gap with a second azimuth angle, said third head being arranged at a position offset by a predetermined amount from a position located 180° from said first head and each of said heads being disposed at one of (i) a respective reference position and (ii) a respective offset position that is offset from a corresponding reference position in the rotational direction of said drum, the reference positions of said heads being arranged at equal intervals on the periphery of said drum and at least said first head being disposed at the respective offset position; and a fifth head with a head gap having the second azimuth angle, said fifth head being arranged adjacent to said first head and being not disposed at a position rotated 180° from said third head, wherein said first through fifth heads are configured to record information on the recording medium in accordance with information signals and/or reproduce information from the recording medium.

12. An apparatus according to claim 11, wherein said second and fourth heads are arranged at the respective offset positions.

13. An apparatus according to claim 12, wherein said second, third, fourth and fifth heads are respectively offset from the position of said first head in an axial direction along a rotation axis of said rotatable drum, by an amount corresponding to the offset of the respective head from the respective reference position.

14. A method according to claim 9, wherein said step of recording information on and/or reproducing information from the recording medium comprises using the first, second, third, and fourth heads when the recording medium is moved at a first speed, and using the third and fifth heads when the recording medium is moved at one half of the first speed.

* * * * *

UNITED STATES PATENT AND TRADEMARK OFFICE
CERTIFICATE OF CORRECTION

PATENT NO. : 5,576,907
DATED : November 19, 1996
INVENTOR(S) : MASAHIDE HASEGAWA It is certified that error appears in the above-indentified patent and that said Letters Patent is hereby corrected as shown below:

COLUMN 4:

Line 28, "internals" should read --intervals--.

COLUMN 15:

Line 31, "refer-" should be deleted;
Line 32, "ence" should read --offset--.

Signed and Sealed this

Twenty-second Day of April, 1997

Attest:

BRUCE LEHMAN

*Commissioner of Patents and Trademarks*

Attesting Officer